United States Patent
Takata et al.

(10) Patent No.: US 9,240,821 B2
(45) Date of Patent: Jan. 19, 2016

(54) COMMUNICATION SYSTEM

(75) Inventors: Yousuke Takata, Osaka (JP); Yutaka Komatsu, Osaka (JP); Takeshi Hagihara, Osaka (JP); Hiroya Andoh, Aichi (JP); Yuta Ochiai, Aichi (JP); Ryuichi Kamaga, Aichi (JP); Atsushi Iwai, Aichi (JP); Yukihiro Miyashita, Aichi (JP); Nobuyuki Nakagawa, Aichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/232,215

(22) PCT Filed: Jul. 13, 2012

(86) PCT No.: PCT/JP2012/067965
§ 371 (c)(1),
(2), (4) Date: May 28, 2014

(87) PCT Pub. No.: WO2013/008922
PCT Pub. Date: Jan. 17, 2013

(65) Prior Publication Data
US 2014/0254695 A1 Sep. 11, 2014

(30) Foreign Application Priority Data

Jul. 13, 2011 (JP) .................................. 2011-155223

(51) Int. Cl.
*H04B 3/00* (2006.01)
*H04B 3/54* (2006.01)
(Continued)

(52) U.S. Cl.
CPC .............. *H04B 3/54* (2013.01); *B60L 11/1818* (2013.01); *B60L 11/1824* (2013.01);
(Continued)

(58) Field of Classification Search
CPC .. H04B 3/54; H04B 3/548; H04B 2203/5416; H04B 2203/547; B60L 11/1838; B60L 11/18; B60L 2270/147; B60L 11/1861; B60L 11/1818; B60L 11/1846; B60L 11/1824; B60L 2210/30; B60L 2240/527; H02J 7/00; Y02T 90/121; Y02T 90/128; Y02T 90/16; Y02T 10/7005; Y02T 90/163; Y02T 90/14
USPC ........... 375/258; 320/108, 137, 138; 327/546, 327/633; 324/705; 307/104
See application file for complete search history.

(56) References Cited

U.S. PATENT DOCUMENTS 4,667,194 A 5/1987 Frank
4,668,934 A 5/1987 Shuey
(Continued)

FOREIGN PATENT DOCUMENTS

CN 101422089 A 4/2009
JP 61-101127 A 5/1986
(Continued)

OTHER PUBLICATIONS

Bossche, et al., "Trends and Development Status of IEC Global Electric Vehicle Standards," Journal of Asian Electric Vehicle, Dec. 2010, vol. 8, No. 2, pp. 1409-1414.
(Continued)

*Primary Examiner* — Dhaval Patel
(74) *Attorney, Agent, or Firm* — McDermott Will & Emery LLP

(57) ABSTRACT

A charging station performs communications by use of a superimposing/separating unit configured by connecting a capacitor, a coupling transformer and a capacitor to branch lines branching out respectively from a control cable and a grounded cable. An electric vehicle performs communications by use of a superimposing/separating unit configured by providing a coupling transformer to the control cable. A capacitor is also connected between the control cable and the grounded cable. Communications are allowed by the configuration of a closed loop circuit comprising the control cable, the branch line, the capacitor, a primary coil of the coupling transformer, the capacitor, the branch line, the grounded cable, the capacitor, and a primary coil of the coupling transformer.

7 Claims, 2 Drawing Sheets

(51) Int. Cl.
*H02J 7/00* (2006.01)
*B60L 11/18* (2006.01)

(52) U.S. Cl.
CPC ........ *B60L 11/1846* (2013.01); *B60L 11/1861* (2013.01); *H02J 7/00* (2013.01); *H04B 3/548* (2013.01); *B60L 2210/30* (2013.01); *B60L 2240/527* (2013.01); *B60L 2270/147* (2013.01); *H04B 2203/547* (2013.01); *H04B 2203/5416* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | |
|---|---|---|
| 2002/0171535 A1 | 11/2002 | Cern |
| 2006/0170285 A1 | 8/2006 | Morimitsu et al. |
| 2009/0102433 A1 | 4/2009 | Kamaga |
| 2011/0134976 A1 | 6/2011 | Fossion et al. |
| 2012/0002714 A1 | 1/2012 | Varadarajan et al. |
| 2012/0029728 A1 | 2/2012 | Hirayama et al. |
| 2012/0161797 A1* | 6/2012 | Hein .............................. 324/705 |

FOREIGN PATENT DOCUMENTS

| | | |
|---|---|---|
| JP | 61-136327 | 6/1986 |
| JP | 61-147621 A | 7/1986 |
| JP | 3-228438 B2 | 10/1991 |
| JP | 10-234142 A | 9/1998 |
| JP | 2000150174 A | 5/2000 |
| JP | 2004-532562 A | 10/2004 |
| JP | 2007-013812 A | 1/2007 |
| JP | 2009-106053 A | 5/2009 |
| JP | 2011-015530 A | 1/2011 |
| JP | 2011-109670 A | 6/2011 |
| JP | 2011-172363 A | 9/2011 |
| JP | 2012-034484 A | 2/2012 |
| JP | 2012-175562 A | 9/2012 |
| JP | 2013-38760 | 2/2013 |
| WO | 2010100951 A1 | 9/2010 |
| WO | 2012/176832 A1 | 12/2012 |
| WO | 2012/176833 A1 | 12/2012 |
| WO | 2013/008903 A1 | 1/2013 |
| WO | 2013/008921 A1 | 1/2013 |

OTHER PUBLICATIONS

International Search Report of PCT/JP2012/067965 dated Aug. 21, 2012.

SAE International (Society of Automotive Engineers International), Surface Vehicle Recommended Practice, Jul. 2012.

Japanese Office Action dated Oct. 6, 2015 issued in Japanese Patent Application No. 2013-524005 (English translation).

C. Bleijs, "Low-cost charging systems with full communication capability," EVS24 International Battery, Hybrid and Fuel Cell Electric Vehicle Symposium, May 13, 2009.

* cited by examiner

COMMUNICATION SYSTEM

CROSS-REFERENCE TO RELATED APPLICATIONS

This application is the national phase under 35 U.S.C. §371 of PCT International Application No. PCT/JP2012/067965 which has an International filing date of Jul. 13, 2012 and designated the United States of America.

BACKGROUND

1. Technical Field

The present invention relates to a communication system in which a power feeding device and a power receiving device are connected with each other through a cable, and communication of control signals necessary for charge control based on power feeding from the power feeding device to the power receiving device is performed through the cable.

2. Description of Related Art

In recent years, electric and hybrid vehicles have become widespread, which are provided with devices such as a motor, a battery and the like, and which run by the motor driven by power stored in the battery. An electric vehicle needs to be charged from an external power feeding device to a battery. A hybrid vehicle includes a plug-in hybrid vehicle which can also be charged from an external power feeding device to a battery. In a vehicle charged from the outside to its battery, a plug of a charge cable connected to an external power feeding device is connected to a connector device at a feeding port provided at the vehicle and power is fed through a charge cable from the power feeding device to the battery of the vehicle so as to charge the battery.

Moreover, in charging from a feeding device to a vehicle, a charge control system may be employed in which a control cable transmitting and receiving a control pilot signal to/from the power feeding device and the vehicle, and charge control is performed based on the control pilot signal (see Japanese Patent Application Laid-Open No. 2009-106053, for example).

Furthermore, as power feeding from a power feeding device has widely been commercialized, it has been required to employ communication function of transmitting and receiving information for management of charge amount management, accounting management and the like between a vehicle and a power feeding device.

A communication system has thus been noted in which communication signals including information used for management and the like are superimposed onto control pilot signals communicated through a control cable. In this communication system, such a configuration is employed that an electromagnetic inductive signal transformer (a circuit element such as a coupling transformer) which superimposes or separates signals onto or from a control cable is connected to a branch line from each control cable.

SUMMARY

In the communication system described above, however, the control cable needs to be branched, and thus an extra space is required for placing a branched portion of the cable and the branched lines. Since a number of electronic devices are mounted on a vehicle such as an electric vehicle, there is only a limited space in the vehicle for placing various devices. With the configuration of the communication system described above, therefore, it is not easy to secure a space for placing the branched portion and branched lines of the control cable. Reduction in size and space is thus required for the devices necessary for the communication.

Meanwhile, a charging station installed outside a vehicle or a power feeding device installed in a rather spacy area, for example, near a parking space at a car-owner's house, is less limited in its installation space compared to the case with devices in a vehicle. For built-in various devices, instead of considering reduction in size or space thereof, devices which have proven to be successful in the past may preferably be employed. Furthermore, in facilities such as a charging station where different vehicles stop by, devices with widely-adopted configurations may preferably be employed in light of compatibility.

The present invention has been made in view of the above circumstances. An object of the invention is to provide a communication system for realizing communication in the case where a control signal such as a control pilot signal is superimposed by a signal different from the control signal, even when wiring with a configuration setting a high value on actual performance and compatibility is coexistent with wiring with another configuration setting a high value on reduction in size and space.

A communication system according to the present invention, in which a power feeding device is connected to a vehicle on which an electric storage device receiving power from the power feeding device through two cables, and communication of a control signal required for charge control of the electric storage device is performed through the cables, is characterized in that one of the power feeding device and the vehicle includes a first superimposing/separating unit connected to two branch lines branched from the two cables, respectively, and performing superimposition of a communication signal different from the control signal onto communication through the cables and performing separation of the communication signal superimposed onto the communication through the cables, and a first communication unit transmitting and receiving a communication signal through the first superimposing/separating unit, and that another one of the power feeding device and the vehicle includes a second superimposing/separating unit located in one of the cables and performing superimposition of the communication signal onto communication through the cable and performing separation of the communication signal superimposed onto the communication through the cable, and a second communication unit transmitting and receiving a communication signal through the second superimposing/separating unit.

The communication system according to the present invention is characterized in that the first superimposing/separating unit includes a capacitor connected to each of the two branch lines, a first signal transformer of an electromagnetic induction type in which a primary coil is connected to the capacitor and a secondary coil is connected to the first communication unit, and that the second superimposing/separating unit includes a second signal transformer of an electromagnetic induction type in which a primary coil is interposed in said one of the cables and a secondary coil is connected to the second communication unit, and a capacitor connected between the two cables.

The communication system according to the present invention is characterized in that one of the cables is grounded.

A communication system according to the present invention, in which a power feeding device is connected to a power receiving device by two cables, and communication of a control signal required for charge control based on power fed from the power feeding device to the power receiving device is performed through the cables, is characterized in that one of the power feeding device and the power receiving device includes a first superimposing/separating unit connected to two branch lines branched from the two cables, respectively, and performing superimposition of a communication signal different from the control signal onto communication through the cables and separation of the communication signal superimposed onto the communication through the cables, and a first communication unit transmitting and receiving a communication signal through the first superimposing/separating unit, and that another one of the power feeding device and the power receiving device includes a second superimposing/separating unit located in one of the cables and performing superimposition of the communication signal onto communication through the cable and separation of the communication signal superimposed onto the communication through the cable, and a second communication unit transmitting and receiving a communication signal through the second superimposing/separating unit.

In the present invention, one of the devices connected through cables is provided with the first superimposing/separating unit having a signal transformer of an electromagnetic induction type such as a coupling transformer at two branch lines branched from two cables, while another one of the devices is provided with the second superimposing/separating unit having a signal transformer of an electromagnetic induction type at one of the cables. By thus making the configuration concerning wiring for the device on one side different from that for the device on another side, actual performance and compatibility may be emphasized on one side while reduction in size and space may be achieved on another side.

Moreover, in the present invention, a closed loop circuit including, continuously, one cable, one branch line, a capacitor for a device on one side, a primary coil for a device on one side, a capacitor for a device on one side, another branch line, another cable, a primary coil for a device on another side, a capacitor for a device on another side and one cable, . . . continued from one to another. This allows communication through a control pilot line and a GND line to be performed.

Furthermore, in the present invention, a resistance value and a turn ratio of a coil may be so set as to satisfy a predetermined condition, allowing both devices to perform communication in the substantially same communication band, and thereby preventing communication from being adversely affected due to abnormality caused by noise getting mixed in.

The present invention is applied to a communication system in which, when power is fed from a power feeding device, two cables for transmitting a control signal such as a control pilot signal required for charge control are used to transmit a communication signal different from a control signal. One of the device on the power feeding side and the device on the power receiving side is provided with the first superimposing/separating unit connected to two branch lines branched from the two cables, respectively, and performing superimposition and separation of communication signals, whereas another one of the devices is provided with the second superimposing/separating unit located in one of the cables and performing superimposition and separation of communication signals. Such a configuration allows the device on one side to emphasize actual performance and compatibility, and the device on another side to reduce the size and space, presenting beneficial effects. It is therefore possible to have such a configuration that a power feeding device such as a public charging station which has abundant space but needs to have compatibility is provided with the first superimposing/separating unit, while a vehicle for which reduction in size and space is desired is provided with the second superimposing/separating unit.

The above and further objects and features of the invention will more fully be apparent from the following detailed description with accompanying drawings.

DETAILED DESCRIPTION

The present invention will specifically be described below with reference to the drawings illustrating the embodiments thereof.

Embodiment 1

Figure 1:
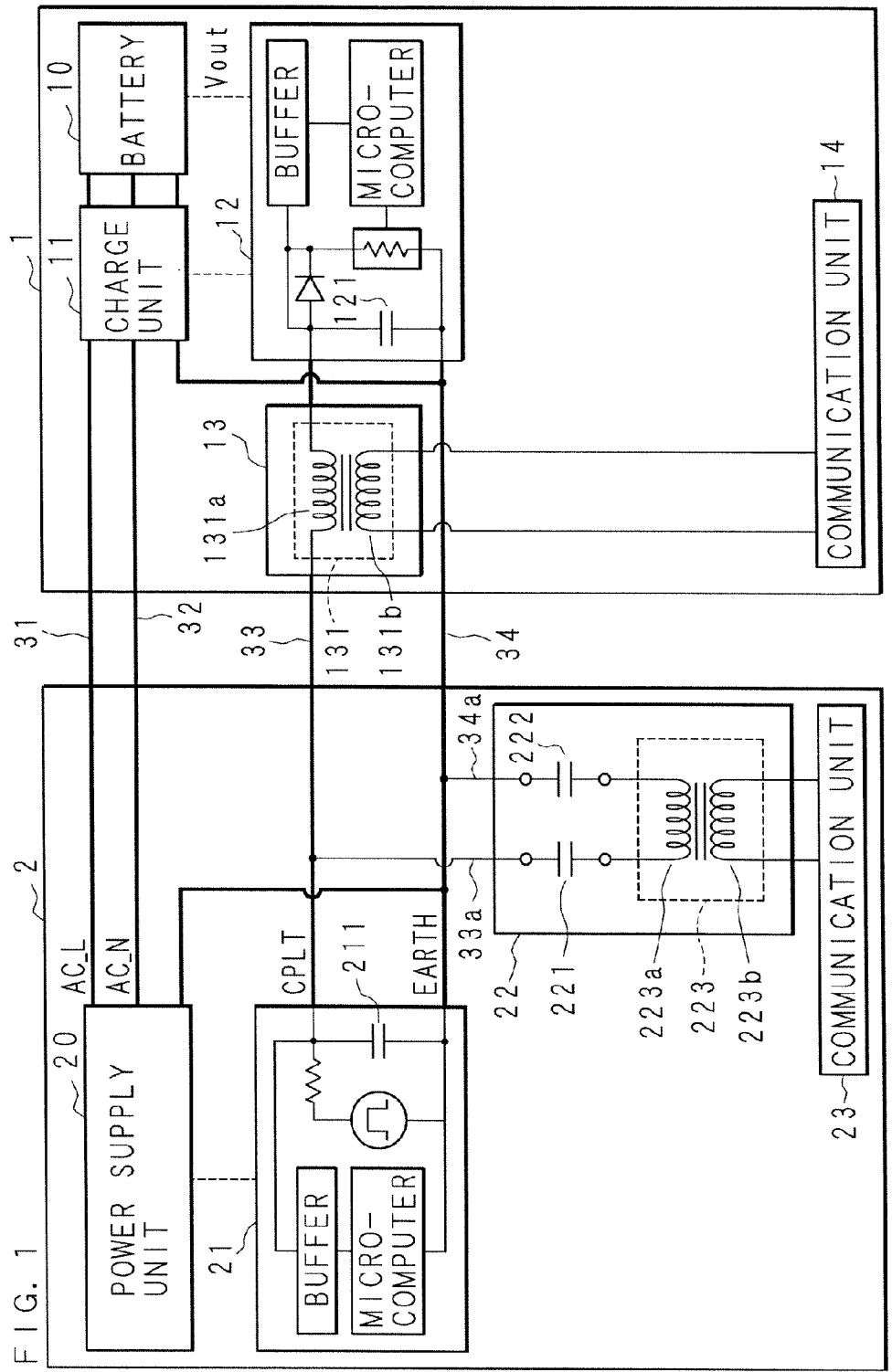
FIG. 1 is an explanatory view illustrating a configuration example of a communication system according to Embodiment 1.

FIG. 1 is an explanatory view illustrating a configuration example of a communication system according to Embodiment 1 of the present invention. Embodiment 1 describes an example where the invention is applied to feed control in feeding power from a charging station 2 serving as a feeding device to a battery (electric storage device) 10 included in an electric vehicle 1. The electric vehicle 1 and the charging station 2 are connected with each other by two charge cables 31 and 32 used as power supply lines, a control cable 33 for transmitting a control signal required for charge control, and a ground cable 34. These various cables form a circuitry illustrated in FIG. 1 when coupling a plug located at the end of the cable on the charging station 2 side with a connection port located on the electric vehicle side.

The charge cables 31 and 32 are AC lines to which alternate current voltage is applied. The control cable 33 is a signal line for transmitting and receiving control signals such as control pilot signals, and charge control is performed based on the control pilot signals that are sent and received. Furthermore, in the communication system according to the present invention, two cables of the control cable 33 and the ground cable 34 are used to transmit information for management such as the charge management and accounting management as well as other various kinds of information, as communication signals different from the control signals. In other words, the communication system of the present invention is to superimpose a communication signal onto a control signal (control pilot signal) to be transmitted through two cables of the control cable 33 and ground cable 34 and to perform communication.

The charging station 2 includes a power supply unit 20 supplying alternate current (hereinafter also referred to as AC) power, a charge control unit 21 performing communication concerning charge control, a superimposing/separating unit 22 superimposing and separating communication signals, and a communication unit 23 transmitting and receiving communication signals. The power supply unit 20 is connected to one end of each of the charge cables 31 and 32, and to the ground cable 34. The charge control unit 21 is connected to one end of the control cable 33 and to the ground cable 34. While the control cable 33 and ground cable 34 correspond to internal wiring serving as extension cables for each of the cables in the charging station 2, the portions of the extended cables disposed as internal wiring will be described as the control cable 33 and ground cable 34 in the description below.

Each of the control cable 33 and ground cable 34 is connected to one end of each of branch lines 33a and 34a that are branched between the charge control unit 21 and the plug. The other end of each of the branch lines 33a and 34a is connected to the superimposing/separating unit 22.

The charge control unit 21 includes various elements such as a capacitor 211 connecting the control cable 33 with the ground cable 34, as well as various circuits such as a rectangular-wave oscillation circuit, a microcomputer and a buffer. The charge control unit 21 is a circuit on the output side conforming to the international standard concerning charge control, which performs charge control in different states such as the connection confirmation or the start of energizing by transmitting and receiving control signals such as control pilot signals.

The superimposing/separating unit 22 includes capacitors 221 and 222 as well as a coupling transformer (signal transformer of an electromagnetic induction type) 223. In the superimposing/separating unit 22, a terminal on one end of each of the capacitors 221 and 222 is connected to the other end of each of the branch lines 33a and 34a. A terminal on the other end of each of the capacitors 221 and 222 is connected to a primary coil 223a of the coupling transformer 223. In other words, the branch line 33a, capacitor 221, primary coil 223a of coupling transformer 223, capacitor 222 and branch line 34a are connected in series between the control cable 33 and the ground cable 34 in this order. A secondary coil 223b of the coupling transformer 223 is then connected to the communication unit 23.

The superimposing/separating unit 22 superimposes a communication signal or separates the superimposed communication signal onto/from the communication of a control signal through two cables of the control cable 33 and ground cable 34. Accordingly, the superimposing/separating unit 22 superimposes various kinds of communication signals output from the communication unit 23 or inputs the separated various kinds of communication signals to the communication unit 23, to implement communication in the communication unit 23.

The electric vehicle 1 includes, in addition to the battery 10, a charge unit 11 for charging the battery 10, a charge control unit 12 performing communication concerning charge control, a superimposing/separating unit 13 performing superimposition and separation for communication signals, and a communication unit 14 transmitting and receiving communication signals.

The electric vehicle 1 is connected to the other end of each of the charge cables 31 and 32, the other end of the control cable 33 and the ground cable 34. The other end of each of the charge cables 31 and 32 is connected to the charge unit 11 through the AC lines disposed inside the electric vehicle 1, and the battery 10 is charged by the charge unit 11. The other end of the control cable 33 is connected to the charge control unit 12 through an extension cable disposed as internal wiring in the electric vehicle 1. Moreover, the ground cable 34 is connected to the charge unit 11, battery 10 and charge control unit 12. In the description below, the extended cables disposed as internal wiring are also included in the control cable 33 and ground cable 34 for the sake of convenience.

The charge control unit 12 includes various elements such as a capacitor 121 connecting the control cable 33 with the ground cable 34, and various circuits such as a microcomputer and a buffer. The charge control unit 12 is a circuit on the input side conforming to the international standard concerning charge control, which performs charge control in different states such as the connection confirmation or the start of energizing by transmitting and receiving control signals such as control pilot signals.

In the electric vehicle 1, a superimposing/separating unit 13 is disposed on the control cable 33. The superimposing/separating unit 13 includes a coupling transformer (signal transformer of electromagnetic induction type) 131, in which a primary coil 131a of the coupling transformer is interposed in the control cable 33. A secondary coil 131b of the coupling transformer 131 is connected to the communication unit 14.

The superimposing/separating unit 13 superimposes a communication signal and separates the superimposed communication signal onto/from the communication of a control signal. Accordingly, the superimposing/separating unit 13 superimposes various kinds of communication signals output from the communication unit 14 and inputs the separated various kinds of communication signals to the communication unit 14, to implement communication in the communication unit 14.

The charging station 2 and electric vehicle 1 are connected with each other by the charge cables 31, 32, control cable 33 and ground cable 34, so that the energization path by the charge cables 31 and 32 as well as the transmission path for control signals by the control cable 33 are secured and also grounding is ensured. In the state where the charging station 2 and electric vehicle 1 are connected with each other by the control cable 33 and ground cable 34, the control cable 33, ground cable 34, branch lines 33a, 34a, capacitors 221, 222, primary coil 223a of coupling transformer 223, capacitor 121 of charge control unit 12, and primary coil 131a of coupling transformer 131 form a closed current loop circuit. The coupling transformers 223 and 131 arranged in the loop allows communication signals to be superimposed and separated, which enables communication to be performed between the charging station 2 and electric vehicles.

In the electric control system having the configuration above, the communication unit 23 in the charging station 2 performs communication using the superimposing/separating unit 22 with a configuration in which the branch lines 33a and 34a branched from the control cable 33 and ground cable 34 are connected to the capacitors 221, 222 and coupling transistor 223, while the communication unit 14 in the electric vehicle 1 performs communication using superimposing/separating unit 13 with a configuration in which the coupling transformer 131 is installed in the control cable 33 and the capacitor 121 is connected between the control cable 33 and ground cable 34, which allows the charging station 2 and electric vehicle 1 to have differently-configured communication devices mounted thereto. In the state where the charging station 2 is connected to the electric vehicle 1 by the control cable 33 and ground cable 34, the control cable 33, ground cable 34, branch lines 33a, 34a, capacitors 221, 222, primary coil 223a of coupling transformer 223, capacitor 121, and primary coil 131a of coupling transformer 131 form a closed current loop circuit. This enables communication to be performed between the charging station 2 and the electric vehicle 1.

When configured as described above, a device concerning communication mounted to the electric vehicle 1 does not need to have the control cable 33 and ground cable 34 branched, and therefore does not need to reserve a space for installation of branch parts or branch lines in the electric vehicle 1. It is thus possible to realize reduction in size and space, compared to the device concerning communication in the charging station 2.

Embodiment 2

Embodiment 2 shows a configuration in which, in Embodiment 1, a device concerning communication is disposed by installing branch parts and branch lines for a control cable and a ground cable on the electric vehicle side, while a superimposing/separating unit is provided in a control cable on the charging station side. In the description below, configuration parts similar to those in Embodiment 1 are denoted by similar reference codes, for which reference may be made to Embodiment 1, and will not be described in detail here.

Figure 2:
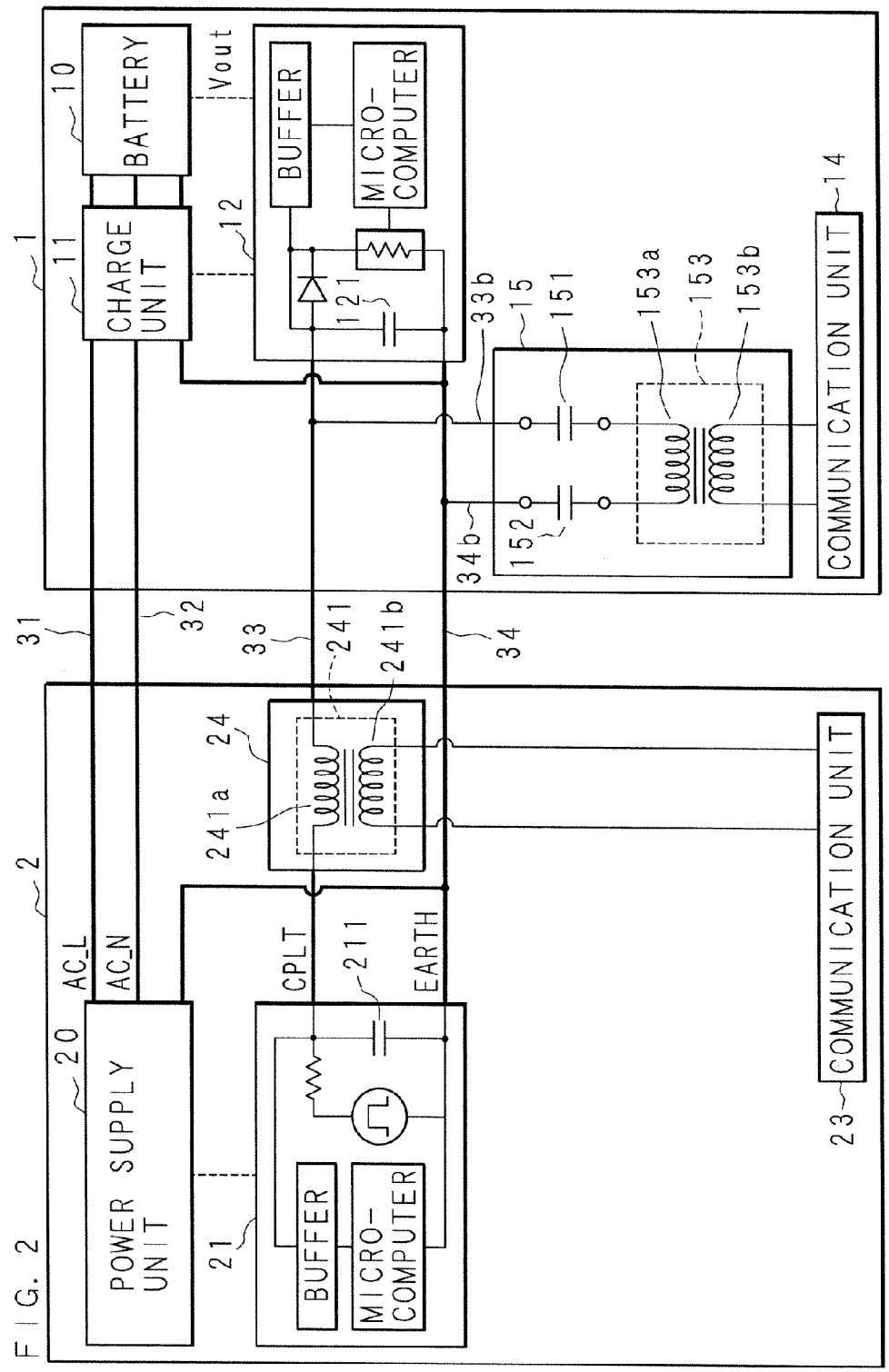
FIG. 2 is an explanatory view illustrating a configuration example of a communication system according to Embodiment 2.

FIG. 2 is an explanatory view illustrating a configuration example of a communication system according to Embodiment 2. A charge control unit 21 included in a charging station 2 is connected to a control cable 33 and a ground cable 34. On the control cable 33 in the electric vehicle 1, a superimposing/separating unit 24 is disposed. The superimposing/separating unit 24 is provided with a coupling transformer (signal transformer of an electromagnetic induction type) 241, in which a primary coil 241a of the coupling transformer 241 is interposed in the control cable 33. A secondary coil 241b of the coupling transformer 241 is connected to the communication unit 23.

The superimposing/separating unit 24 superimposes communication signals and separates the superimposed communication signals onto/from the communication of control signals. Accordingly, the superimposing/separating unit 24 superimposes various kinds of communication signals output from the communication unit 23 and inputs the separated various kinds of communication signals to the communication unit 3, to perform communication in the communication unit 23.

The charge control unit 12 included in the electric vehicle 1 is connected to the control cable 33 and ground cable 34. Each of the control cable 33 and ground cable 34 in the electric vehicle 1 is connected to one end of each of branch lines 33b and 34b branched in an area between the charge control unit 12 and a connection port. The other end of each of the branch lines 33b and 34b is connected to a superimposing/separating unit 15.

The superimposing/separating unit 15 includes capacitors 151, 152 and a coupling transformer (signal transformer of an electromagnetic induction type) 153. In the superimposing/separating unit 15, the other ends of the respective branch lines 33b and 34b are connected with terminals on one-end sides of the capacitors 151 and 152. The terminal on the other end side of each of the capacitors 151 and 152 is connected to a primary coil 153a of the coupling transformer 153. In other words, the branch line 33b, capacitor 151, primary coil 153a of coupling transformer 153, capacitor 152 and branch line 34b are connected in series between the control cable 33 and the ground cable 34 in this order. The secondary coil 153b of the coupling transformer 153 is then connected to the communication unit 14.

The superimposing/separating unit 15 superimposes communication signals and separates the superimposed communication signals onto/from the communication of control signals through two cables of the control cable 33 and the ground cable 34. Accordingly, the superimposing/separating unit 15 superimposes various kinds of communication signals output from the communication unit 14 and inputs the separated various kinds of communication signals to the communication unit 14, to perform communication in the communication unit 14.

Such a configuration allows a closed current loop circuit to be formed and communication to be performed between the charging station 2 and the electric vehicle 1 in communication in any directions, as in the case with Embodiment 1.

While each of Embodiments 1 and 2 described an example in which an electric vehicle is employed as a vehicle having a communication function, the present invention is not limited thereto, but may employ another vehicle having a function of being charged to its battery from an external source, such as a plug-in hybrid vehicle. Moreover, though an example where a charging station is employed as a power feeding device having a communication function, the present invention is not limited thereto, but may employ another device having a function of feeding power to a vehicle through a control cable. For example, when charge control is performed by a control cable in the case where a user connects a charge cable to an electric outlet installed at his/her house to charge a vehicle, a device concerning communication may be installed on a switchboard in the house. Furthermore, a circuit in which power line communication is performed may be mounted in a control cable. Moreover, a cable other than a ground cable may be used as a cable to be combined with a control cable. While a control cable and a ground cable are used as communication paths for control signals or communication signals, a conductor such as a vehicle body or a housing of a power feeding device may be used for one or both of the above.

Furthermore, in charge control at the time of charging a vehicle such as an electric vehicle, the configuration of the power control system according to the present invention may be applied not only to in-band communication but also to other various communication systems performing in-band communication (system in which a personal computer, a mobile terminal electronic device and AV devices perform power line communication at home or in office, for example).

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication system comprising:
a power feeding device, and
a vehicle connected to the power feeding device by two cables, and the vehicle having an electric storage device receiving power from the power feeding device, and communication of a control signal required for charge control of the electric storage device is performed through the cables, wherein
one of the power feeding device and the vehicle includes
a first superimposing/separating unit connected to two branch lines branched from the two cables, respectively, and performing superimposition of a communication signal different from the control signal onto communication through the cables and performing separation of the communication signal superimposed onto the communication through the cables, and
a first communication unit transmitting and receiving a communication signal through the first superimposing/separating unit, and that
another one of the power feeding device and the vehicle includes
a second superimposing/separating unit located in only one of the two cables and performing superimposition of the communication signal onto communication through the cable and performing separation of the communication signal superimposed onto the communication through the cable, and a second communication unit transmitting and receiving a communication signal through the second superimposing/separating unit.

2. The communication system according to claim 1, wherein the first superimposing/separating unit includes
  a capacitor connected to each of the two branch lines, and
  a first signal transformer of an electromagnetic induction type in which a primary coil is connected to the capacitor and a secondary coil is connected to the first communication unit, and that the second superimposing/separating unit includes
  a second signal transformer of an electromagnetic induction type in which a primary coil is interposed in said one of the cables and a secondary coil is connected to the second communication unit, and
  a capacitor connected between the two cables.

3. The communication system according to claim 1, wherein one of the cables is grounded.

4. The communication system according to claim 2, wherein one of the cables is grounded.

5. A communication system comprising:
a power feeding device, and
a power receiving device connected to the power feeding device by two cables, and communication of a control signal required for charge control based on power fed from the power feeding device to the power receiving device is performed through the cables, wherein
one of the power feeding device and the power receiving device includes
  a first superimposing/separating unit connected to two branch lines branched from the two cables, respectively, and performing superimposition of a communication signal different from the control signal onto communication through the cables and separation of the communication signal superimposed onto the communication through the cables, and
  a first communication unit transmitting and receiving a communication signal through the first superimposing/separating unit, and that
another one of the power feeding device and the power receiving device includes
a second superimposing/separating unit located in only one of the two cables and performing superimposition of the communication signal onto communication through the cable and separation of the communication signal superimposed onto the communication through the cable, and a second communication unit transmitting and receiving a communication signal through the second superimposing/separating unit.

6. A communication system comprising:
a power feeding device, and
a vehicle connected to the power feeding device by two cables, and the vehicle having an electric storage device receiving power from the power feeding device, and communication of a control signal required for charge control of the electric storage device is performed through the cables, wherein
one of the power feeding device and the vehicle includes
  a first superimposing/separating unit connected to two branch lines branched from the two cables, respectively, and performing superimposition of a communication signal different from the control signal onto communication through the cables and performing separation of the communication signal superimposed onto the communication through the cables, and
  a first communication unit transmitting and receiving a communication signal through the first superimposing/separating unit, and that
another one of the power feeding device and the vehicle includes
  a second superimposing/separating unit located in one of the cables and performing superimposition of the communication signal onto communication through the cable and performing separation of the communication signal superimposed onto the communication through the cable, and
  a second communication unit transmitting and receiving a communication signal through the second superimposing/separating unit,
wherein
the first superimposing/separating unit includes
a capacitor connected to each of the two branch lines, and
a first signal transformer of an electromagnetic induction type in which a primary coil is connected to the capacitor and a secondary coil is connected to the first communication unit, and that
the second superimposing/separating unit includes
a second signal transformer of an electromagnetic induction type in which a primary coil is interposed in said one of the cables and a secondary coil is connected to the second communication unit, and
a capacitor connected between the two cables.

7. The communication system according to claim 6, wherein one of the cables is grounded.

* * * * *